Dec. 1, 1942.   G. S. DAUPHINEE   2,303,334
AIR PURIFICATION
Filed June 5, 1940
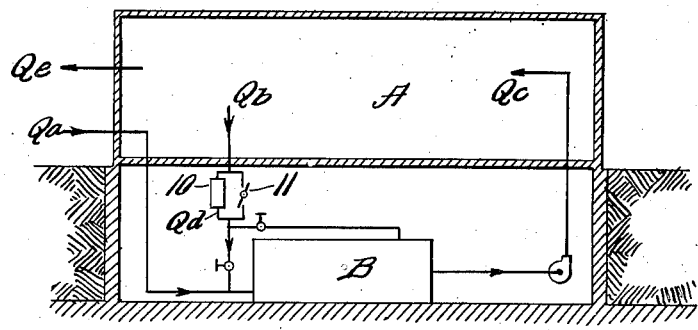
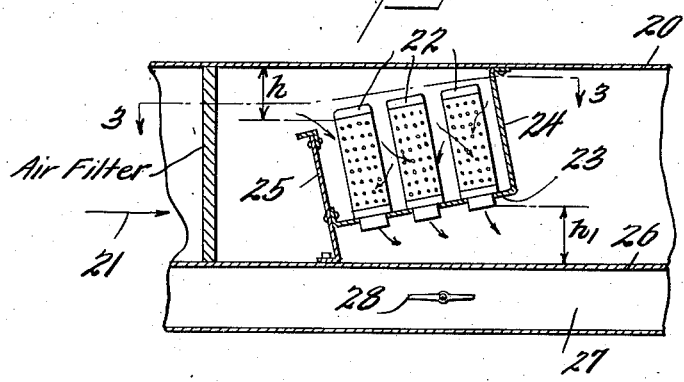
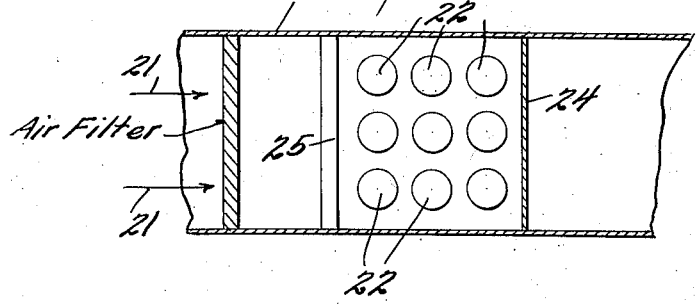
Inventor
George S. Dauphinee
By Moses & Nolte
Attorneys Patented Dec. 1, 1942

2,303,334

UNITED STATES PATENT OFFICE 2,303,334

AIR PURIFICATION

George S. Dauphinee, Brooklyn, N. Y., assignor to W. B. Connor Engineering Corp., New York, N. Y., a corporation of New York Application June 5, 1940, Serial No. 339,006

6 Claims. (Cl. 98—33)

This invention relates generally to methods and systems of air conditioning, and has for its general object an improvement in such methods and systems which will substantially reduce the power consumption of the system and which will also reduce the cost of the installation of the system.

More particularly the present invention aims to provide a method, system and apparatus of air conditioning which reduces to a minimum the introduction of fresh atmospheric air thereby greatly reducing the power consumed in conditioning fresh air for temperature and humidity.

The present invention further aims to facilitate the alteration of any operating air conditioning installation so that it may be made to operate with greater efficiency and at a substantially reduced cost of operation.

Another phase of the present invention resides in conducting the air conditioning system in such a manner that the odors generated by the occupants of the enclosure, chamber, or auditium are continually being withdrawn or removed by suitable odor removing substances thereby constantly maintaining the air in the enclosure below the threshold concentration of odorous gases.

Many air conditioning system now extant introduce large amounts of fresh atmospheric air into the system for the double purpose of maintaining the $CO_2$ concentration of the air in the auditorium or other enclosure at a tolerable low level and also for the purpose of maintaining the concentration of odorous gases in the enclosure below the threshold level. In such systems a substantial proportion of the power consumed is directed towards the conditioning as to temperature and humidity of the inflowing external air. The temperature and humidity conditions of such air is at greater variance with the desired conditions than the recirculating body of air flowing from the chamber or enclosure. Thus volume for volume a greater amount of power is consumed in conditioning the inflowing external air than in conditioning the circulating air from the chamber. A reduction in the rate of introduction of fresh external air therefore results in substantial savings of power.

Essentially therefore the present method provides for the introduction of fresh atmospheric air at a rate adequate only to maintain the desired low tolerable concentration of $CO_2$, such rate however being inadequate to maintain the concentration of odorous gases below threshold concentration and at a tolerable level. For the purpose however, of maintaining the desired low concentration of odorous gases in the enclosure, the air withdrawn from the chamber for the purpose of conditioning is treated for odor removal. Under the present invention such treatment is conducted in a manner to minimize the consumption of power and to minimize the cost of the original installation. Briefly stated, by means of the present method, only a fraction of the recirculating air is subjected to such odor removing treatment and in addition the fraction is treated so as to cause preferably incomplete removal of the odorous gases therefrom. The thus treated fraction together with the fresh air introduced have the resultant effect equivalent to withdrawal of odorous gases in an amount equal to the odorous gases generated.

The system and apparatus that are to be employed in the exercise of the present method are those shown in my co-pending application, Serial No. 99,440, filed September 4, 1936, entitled Air purification, and the specific apparatus employed for deodorizing the desired portion of the recirculating air is preferably the apparatus shown in my co-pending application, Serial No. 99,233, filed September 3, 1936, now Patent No. 2,214,737, or the apparatus shown in my application, Serial No. 267,651, filed April 13, 1939, of which applications the present constitutes a continuation in part.

While many other devices and arrangements of such devices for the removal of odorous gases may be employed in the exercise of the present invention, the apparatus specifically disclosed in the above mentioned applications are preferred. These odor removing devices have for their essential characteristic that they do not effect a complete removal of the odorous gases from the gases passing therethrough and that the air flow resistance of these devices and apparatus is low and below the level of one-quarter inch water gauge. The use of such low resistance odorous gas adsorbing devices and apparatus permits the application of the present invention to existing installations. In such installations the fan handling the total air can be increased in speed by a simple change in pulley size to handle the air with the additional resistance as high as one-quarter inch water gauge whereas with the insertion of greater resistance expensive alterations to the fan unit would ordinarily become necessary.

A more detailed understanding of the present invention is given below by reference to the accompanying drawing in which Fig. 1 is a diagrammatic showing illustrating the operation of the system and Figs. 2 and 3 show vertical and horizontal views respectively of a modified arrangement conduit and odor adsorbing device of application Serial No. 99,233 Fig. 3 being taken on line 3—3 of Fig. 2.

Fig. 1 shows in a schematic manner a conventional air conditioning system B for enclosure A. The specific discussion which follows is based particularly on the assumption that the space A is an auditorium such as a theater or the like where only the customary human body odors are generated. It will be understood, however, that for the purposes of the present invention such space A may be any desired living space or may also indicate a space such as a factory or the like where perhaps odors in addition to human body odors are generated. In the treatment of an auditorium or theater or other living space, it is desired to maintain the concentration of odorous gases below the threshold level, namely, below the point at which humans become aware of such odors. It will be understood, however, that in many other installations such as in the conditioning of factories or restaurants or the like, it is not always desirable nor necessary to maintain the concentration of odorous gases below this threshold. In such cases another minimum concentration may be desired at which point such odors may be readily apparent but nevertheless are not highly objectionable. In all installations, however, the present method and system is designed to operate so as to maintain the odorous gas concentration in the system below any desired level.

In the diagram shown in Fig. 1 the flow of outside or fresh atmospheric air that enters the system is indicated by $Qa$. In every such system a corresponding amount of air is necessarily forced out of the system and this is indicated by $Qe$. The recirculating or return air is indicated by $Qb$ and the total conditioning air delivered to the space A is indicated by $Qc$. As shown in this diagram, a portion of the circulating air indicated by $Qd$ is subjected to odor removal in an apparatus indicated at 10. A damper 11 may be employed for controlling the rate of flow of air in the odor adsorbing device 10. The system shown in Figs. 1, 2 and 3 of application Serial No. 99,440 may be employed and for the adsorbing devices the specific apparatus disclosed in the other applications mentioned above may be employed. Figs. 2 and 3 indicate one possible arrangement of the adsorber of odorous gases which may be employed at 10 of Fig. 1. The conduit carrying the return air $Qb$ may if desired be provided with a by-pass and the structure shown in Figs. 2 and 3 may then represent such by-pass. Under some circumstances, however, the conduit shown in Figs. 2 and 3 may itself carry all of the return air $Qb$, the conduit housing within it the adsorbing devices and also providing a passage for that portion of the air which is not subjected to odor removal.

Referring to Fig. 3, the conduit is indicated by reference character 20, the air flow being indicated by the arrow 21. The adsorbing devices 22 are of the form fully and clearly disclosed and described in my co-pending application Serial No. 99,233, now Patent No. 2,214,737, and are carried by the plate 23 which is preferably inclined at an angle to the direction of flow of the air. The plate 23 is supported by a pair of transverse plates 24 and 25 disposed as shown in Figs. 2 and 3. In addition the conduit is provided with the horizontal plate 26 which is attached at the forward end to the bottom of plate 25. The plate 26 is preferably so disposed that the distance of the opening of the highest canister from the plate 26 and as indicated by $h1$ is equal to the distance $h$ which is the distance of the lowest canister from the upper wall of the conduit. This arrangement also provides a by-pass 27 which permits some of the air to flow through without passing through the adsorbing device. This passage 27 is controlled by the damper 28 and when desired this passage may be entirely closed, or the damper may be held also in any desired position so as to bring about the passage of the desired amount of air through the adsorbing device.

Thus it will be understood that in some installations the structures shown in Figs. 2 and 3 correspond to what is shown as reference characters 10 and 11 in Fig. 1 of the drawing. In other installations it may correspond merely to what is indicated by reference character 10 in Fig. 1 of the drawing.

The rate of circulation of air in a recirculation type of air conditioning system as shown in Fig. 1 and as indicated by $Qc$ is governed largely by the needs for controlling temperature and air distribution when either heating or cooling is required. The several factors which determine this rate of circulation include the nature of building construction, climate, dimensions of the space, the extent of occupancy, the method of distribution and other factors.

Prior to the introduction of the present invention, the rate of introduction of fresh air $Qa$ was such as to provide for the maintenance of the desired low concentration of $CO_2$ and the maintenance of the concentration of odorous gases at a tolerable low level. These two factors were the basic considerations in determining the rate of introduction of fresh air into the system. Other factors were frequently considered, such as the amount of air filtration through doors, window cracks, walls etc. In the majority of cases, however, the occupancy factor was the controlling factor.

It has recently been determined that the introduction of fresh air at the rate of 15 cubic feet per minute per occupant is satisfactory to maintain both the odorous gas content and $CO_2$ content within tolerable limits; this rate being particularly applicable for theaters and the like. Obviously in systems where other sources of odors besides body odors are introduced this rate has to be correspondingly increased. The present discussion will be directed to systems employed in conditioning theaters or the like where, in the absence of odor adsorption means, 15 cubic feet of fresh air per minute per occupant is adequate to maintain the desired low concentration of odorous gases and $CO_2$ in the system. It will be understood, however, that the principle of operation of the present system is also applicable to such systems where this rate has to be substantially increased.

The practice commonly followed prior to the introduction of the present invention was to introduce into the system fresh external atmospheric air at a rate somewhat approximating 15 cubic feet per minute per occupant. As has already been pointed out, the conditioning of this air involves the expenditure of a substantial portion of the total energy employed in the system for the reason that there is a greater variance between the desired conditions and the conditions of the external air than between the recirculating air and the desired conditions. The present invention seeks to greatly reduce this consumption of power by reducing the inflow of fresh external atmospheric air to approximately one-third the rate needed for maintaining the desired low $CO_2$ content and odorous gas content. The present invention takes advantage of the results obtained by recent research to the effect that the introduction of three to five cubic feet per minute per occupant is fully adequate to maintain the desired low $CO_2$ content in the system. In the operation of the present system, therefore, the fresh air as indicated in Fig. 1 by $Qa$ is introduced merely at a rate sufficient to maintain the desired low $CO_2$ content. For practical purposes, in each installation this rate is preferably five cubic feet per minute per person; the calculation being preferably based on maximum occupancy. This rate of introduction of fresh air greatly reduces the amount of power consumed in conditioning the fresh air. This rate, however, is totally inadequate for maintaining the odorous gas concentration in the system below the threshold or below any desired minimum. In order, therefore, to maintain the odorous gas content at a desired minimum, the recirculating air $Qb$ is subjected to a deodorizing treatment, the treatment being merely adequate for the maintenance of the desired concentration and inadequate for the complete removal of the odorous gases from such air. As will become more clearly apparent in the later portion of this specification, the employment of an adsorbent device which is inadequate for the complete removal of the odorous gases from the air passing through the device greatly reduces the cost of installation of the system, reduces the cost of operation of the system, and also renders possible the conversion of existing systems into systems operating in accordance with the present invention.

The nature of the adsorbent material and the structural devices which embody such adsorbent material which are preferred for the operation of the present system are disclosed in the copending applications referred to and another form is disclosed in Figs. 2 and 3 of the present application. Obviously other materials and other structures which are suitable for the present purposes may be employed. For a specific embodiment of the present invention the applicant prefers to employ a high grade activated carbon of 8—14 mesh. This adsorbent material has a particular attraction for odorous gases of human origin and but an inconsiderable attraction for moisture. A number of tests were made using 8–14 mesh high grade carbon with a bed velocity of 40 feet per minute. These tests show that equal increments of bed thickness remove substantially the same percentage of the odorous gas content of the air passing through the increment. Thus, in these tests, each one-eighth inch thickness removes substantially half the odorous gas content of the air entering the increment. The following is a tabulation of the results obtained in such tests.

| Thickness of bed of adsorber in inches | Percentage of odorous gases removed from air passing through bed once at 40 ft. per minute |
|---|---|
|  | Per cent |
| 1/8 in | 48.4 |
| 1/4 in | 73.4 |
| 3/8 in | 86.28 |
| 1/2 in | 92.92 |
| 5/8 in | 96.85 |
| 3/4 in | 98.12 |
| 7/8 in | 99.03 |
| 1 in | 99.5 |

The present invention may be illustrated by assuming an air conditioning system for an auditorium.

If no odor adsorber is used the following quantities would be involved:

| | |
|---|---|
| Occupancy | 400 (Assumed) |
| $Qc$ | 16,000 C.F.M. (Assumed) |
| $Qa$, 400×15 | 6,000 C.F.M. |
| $Qb$, 16,000—6,000 | 10,000 C.F.M. |
| $Qe$ equals $Qa$ | 6,000 C.F.M. |

With the employment of adsorbers having a bed thickness of about one inch, and which are designed to remove substantially all the odorous gas content of the gas laden air passing through the adsorber, the calculated quantities appearing above would be as follows:

| | |
|---|---|
| $Qa$, 400×5 | 2,000 C.F.M. |
| $Qb$, 16,000—2,000 | 14,000 C.F.M. |
| $Qe$ equals $Qa$ | 2,000 C.F.M. |
| Bed thickness | 1 inch |
| Bed efficiency in one pass | 100% substantially |
| $Qd$ equals old $Qa$—new $Qa$, 6000—2000 or | 4,000 C.F.M. |
| Capacity of bed per sq. ft. area | 40 cu. ft. |
| Area of bed, 4000÷40 | 100 sq. ft. |
| Weight of carbon—100×34 | 283 lbs. |
| Resistance of bed to air flow at 40 F.P.M. | 0.240 inch w. g. |

The weight of such granular carbon is approximately 34 lbs. per cubic foot. The resistance of a 1 in. bed of this carbon at an air velocity of 40 feet per minute is 0.240 inch w. g. In the exercise of the present invention it is preferred to employ a bed of such granular material of approximately 3/8 in. and not greater than 1/2 in. in thickness. A bed of this material having a thickness of 3/8 in. has a resistance at an air velocity of 40 feet per minute of only 0.131 inch water gauge, and the 1/2 in. bed has a resistance to air velocity under the same conditions of only 0.150 inch water gauge.

The following example will illustrate the system when a 3/8 in. bed is employed:

| | |
|---|---|
| Occupancy | 400 (Assumed) |
| $Qc$ | 16,000 C. F. M. (Assumed) |
| $Qa$, (400×5) | 2,000 C. F. M. |
| $Qd$, $\frac{4000 \times 100}{86.28}$ | 4,630 C. F. M. |
| Bed area, $\frac{4630}{40}$ | 116 sq. ft. |
| Wt. of carbon in beds | 123 lbs. |
| Resistance to air flow at 40 F. P. M. | 0.131 w. g. |

If a bed thickness of 1/2 in. were chosen, then the following results would be obtained:

| | |
|---|---|
| $Qd$ | 4300 C.F.M. |
| Bed area | 107 sq. ft. |
| Weight of carbon in beds | 152 lbs. |
| Resistance to air flow | 0.150 inch w. g. |

It will now be understood that in the system as operated in accordance with the present invention only 2000 cu. ft. per minute of fresh air is introduced, whereas in the absence of an adsorbing device, approximately 6000 cu. ft. per minute of fresh air would be introduced into a system based upon the same assumptions. Thus a substantial saving in the consumption of power for the conditioning of the 4000 cu. ft. of fresh air is obtained. The present invention further provides for an adsorbing device which is inadequate for the complete removal of the odorous gases from the air passing through the deodorizing device at the rate of 40 ft. per minute or whatever rate may actually be employed in the system. By this device of employing what would appear to be an inadequate adsorbing device substantial savings in the quantity and weight of granular carbon are accomplished without detracting from the air quality. Thus in the installation based upon a 400 person occupancy and which requires the introduction of 6000 cubic feet per minute of fresh air, and 2000 cubic feet per minute being introduced from the atmosphere in order to maintain the low $CO_2$ content it would be necessary to treat with adsorbent at least 4000 cu. ft. per minute of the recirculating air. The substantially complete removal of the odorous gases from this air would necessitate a bed of approximately one inch in thickness and such a bed would be 100 sq. ft., the capacity of such a bed being 40 cu. ft. per sq. ft. The weight of such a bed of carbon would be 283 lbs., and as has already been indicated, the resistance of such a bed of air flow at 40 ft. per minute would be 0.240 in. w. g. Thus by the use of a ⅜ in. or ½ in. bed, the weight of carbon is greatly reduced and the power consumed in drawing such air is reduced because of the reduction in the air resistance of the beds. The above illustrations will show to any person skilled in the art the manner in which any system may be designed for the exercise of the present invention.

It will be understood that whether a bed designed to remove substantially all the odorous gas content from the air being treated for odor removal such as by the use of a one inch bed, or whether, in accordance with the preferred form of the present invention, a bed designed to remove only a portion of the odorous content of the air being treated is employed, as by the use of a ⅜ in. bed, the quality of the air in the auditorium, in respect to its freedom from odorous matter, is in all cases the same as that obtained by the introduction of the full fresh air quantity that would be necessary in the absence of odor adsorbing means.

High grade activated carbon will function satisfactorily even after it has removed from the air 10% of its weight of such odorous gas, and the ⅜ in. bed will function satisfactorily for at least two years on a 10 hour day basis when the source of the gas is confined solely to body odors. Were it not for other factors being present which also govern, the life of the carbon bed would vary directly as its thickness, but another such factor does exist, namely, the accumulation of dust in the carbon mass. This unavoidable dust collection gradually tends to increase the bed resistance to air flow, thereby increasing the operating cost. The carbon beds are therefore protected from dust by the use of an air filter which becomes part of the adsorber equipment. The higher the efficiency of the air filter the higher will be the resistance to air flow. This filter resistance becomes the governing factor in the filter choice. A filter of moderate efficiency with moderate resistance is the most practical choice, one that will give reasonable protection from dust collection in the carbon bed for a 2 year period. The resistance of such a filter will be approximately one-tenth of an inch water gauge. From the above, it is to be concluded that for service as hereinbefore outlined carbon weight beyond that of a ⅜ in. or ½ in. bed constitutes unnecessarily high first cost and thicker beds require an unnecessarily high operating cost due to increased resistance to air flow, as from the standpoint of increased resistance due to dust accumulation, the bed should be changed at least once in two years even when air filters are used regardless of its thickness. Thus the combined resistance of the bed and the filter will not exceed ¼ inch water gauge.

The above considerations make it possible to install odor removing devices in all installations. In the first place the additional cost of the installation is not great by reason of the minimum amount of carbon necessary. And in addition, the old fan may be readily stepped up in order to take care of the extra ¼ in. water gauge resistance. Any increase in the resistance beyond this point would ordinarily necessitate substantial alterations or substitutions in the fan or blower system.

As shown, the circulating air is subjected to odor removal treatment on its way from the enclosure to the conditioning apparatus. It is obvious, however, that this treatment may be employed in other portions of the circuit. In the employment of some adsorbent devices, the air passing out of the enclosure is divided into two portions, one of which passes through the deodorizer, the other passing to the conditioning apparatus without being deodorized. In the employment of the grille type of deodorizer shown in my application, Serial No. 267,651, the structural arrangement of the system is further simplified in that no provision need be made for by-passing a portion of the air $Qb$. The grille device shown in application Serial No. 267,651 in its construction provides for a definite percentage of by-pass together with a definite percentage of gas extraction in one pass of the air through the device. The grille type of deodorizer can be adjusted by varying the spacing of the porous adsorbent members which form the grille bars. Thus, if desired, this grille type adsorbent device may be made to occupy the full transverse or cross-sectional area of the return air duct and thereby dispense with the special by-pass and damper used with the full bed or canister type of device. Thus in auditorium installations where the portion of the offensive gas to be removed from the return air is relatively small, the installation of the grille type of adsorber is simple and of low cost.

In this type of installation the grille type may be chosen to cover the transverse cross-sectional area of the return duct and arranged in one plane. This arrangement may be such as to remove only a relatively small percentage of the odorous gas content of the air passing through it. In the system under discussion 14,000 cubic feet of air per minute would be passing through the deodorizer instead of the needed 4000 to 4500. In order, therefore, to remove the desired amount of odorous gas therefrom, only 28.57% of the odorous gas content of the air or approximately from one-quarter to one-third thereof would have to be removed. If the air velocity of the return duct is too high for the one plane arrangement, greater grille area can be obtained by arranging the grille panels in V-formation.

The odor removal device of the present invention is effective throughout the year without any seasonal adjustments, does not conflict with the operation of the air conditioning apparatus, and does not materially affect the temperature or humidity of the air being treated for odor removal.

I claim:

1. The method of reducing the fresh air required for conditioning the air of an enclosure which comprises withdrawing air from said enclosure, subjecting a portion of the withdrawn air to deodorizing action by passing such portion through bodies of activated carbon in which approximately 86 to 95% of the odor is removed from said portion, returning the withdrawn air to the enclosure, subjecting fresh air to temperature and humidity regulation; and introducing the fresh air into the enclosure in an amount sufficient to maintain the carbon dioxide content of the enclosure below the tolerable level but inadequate to maintain the odor content below the tolerable limit, the amount of odor removed from said portion of the air being sufficient in conjunction with the fresh air to maintain the odor content of the enclosure below the tolerable level.

2. An air conditioning system for an enclosure comprising means for withdrawing air from the enclosure and for recirculating the same, means for subjecting a portion of the withdrawn air to deodorizing action, said deodorizing means comprising bodies of activated carbon in which approximately 86 to 95% of the odor is removed from said portion, means for subjecting fresh air to temperature and humidity regulation and means for introducing the fresh air into the enclosure in an amount sufficient to maintain the carbon dioxide content of the enclosure below the tolerable limit but inadequate to maintain the odor content below the tolerable limit, the amount of odor removed by the deodorizing means being sufficient in conjunction with the fresh air to maintain the odor content of the enclosure below the tolerable level.

3. The method of reducing the fresh air required for conditioning the air of an enclosure by circulating air through a circuit including the enclosure and an air conditioning system, which comprises withdrawing air from said enclosure, subjecting such air to conditioning action including the removal of excess moisture therefrom, returning said conditioned air to the enclosure, subjecting a minor portion of the withdrawn air to deodorizing action by passing such portion through bodies of activated carbon capable of removing odor from said portion, the percentage of removal of odor from said portion being such that not less than approximately 25% and not more than approximately 33⅓% of the odor in the air withdrawn from the enclosure is removed, and introducing fresh air into the circuit in an amount sufficient to maintain the carbon dioxide content of the enclosure below the tolerable level but inadequate to maintain the odor content below the tolerable limit, the amount of odor removed being sufficient in conjunction with the fresh air to maintain the odor content of the enclosure below the tolerable limit.

4. The method of reducing the fresh air required for conditioning the air of an enclosure by circulating air through a circuit including the enclosure and an air conditioning system, which comprises withdrawing air from said enclosure, subjecting such air to conditioning action including the removal of excess moisture therefrom, returning said conditioned air to the enclosure, subjecting a minor portion of the withdrawn air to deodorizing action by passing such portion through bodies of activated carbon capable of removing odor from said portion, the percentage of removal of odor from said portion being not less than approximately 70% and not more than approximately 97%, and introducing fresh air into the circuit in an amount sufficient to maintain the carbon dioxide content of the enclosure below the tolerable level but inadequate to maintain the odor content below the tolerable limit, the amount of odor removed from said portion of the air being sufficient in conjunction with the fresh air to maintain the odor content of the enclosure below the tolerable limit.

5. An air conditioning system in which the air is circulated through a circuit including the enclosure to be conditioned and air conditioning devices, said system comprising means for withdrawing air from the enclosure, means for conditioning such air, including means for eliminating excess moisture from said air, means for returning said conditioned air to said enclosure, deodorizing means for subjecting a minor portion of the withdrawn air to deodorizing action, said deodorizing means comprising bodies of activated carbon in which odor is removed from said portion, the total percentage of odor removed from the withdrawn air being not less than approximately 25% and not more than approximately 33⅓%, and means for introducing fresh air into the circuit in an amount sufficient to maintain the carbon dioxide content of the enclosure below the tolerable level but inadequate to maintain the odor content below the tolerable limit, the amount of odor removed by the deodorizing means being sufficient in conjunction with the fresh air to maintain the odor content of the enclosure below the tolerable limit.

6. An air conditioning system in which the air is circulated through a circuit including the enclosure to be conditioned and air conditioning devices, said system comprising means for withdrawing air from the enclosure, means for conditioning such air, including means for eliminating excess moisture from said air, means for returning said conditioned air to said enclosure, deodorizing means for subjecting a minor portion of the withdrawn air to deodorizing action, said deodorizing means comprising bodies of activated carbon in which odor is removed from said portion, the percentage of removal of odor from said portion being not less than approximately 70% and not more than approximately 97%, and means for introducing fresh air into the circuit in an amount sufficient to maintain the carbon dioxide content of the enclosure below the tolerable limit but inadequate to maintain the odor content below the tolerable limit, the amount of odor removed by the deodorizing means being sufficient in conjunction with the fresh air to maintain the odor content of the enclosure below the tolerable limit.

GEORGE S. DAUPHINEE.